US012807145B2

(12) United States Patent
Rudenko et al.

(10) Patent No.: US 12,807,145 B2
(45) Date of Patent: Nov. 24, 2026

(54) METHOD FOR ASCERTAINING A DIRECTION OF TRAVEL OF AN AT LEAST SEMIAUTONOMOUSLY OR AUTONOMOUSLY MOVABLE UNIT, AND DEVICE OR SYSTEM

(71) Applicant: Robert Bosch GmbH, Stuttgart (DE)

(72) Inventors: Andrey Rudenko, Gerlingen (DE); Luigi Palmieri, Stuttgart (DE); Kai Oliver Arras, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 276 days.

(21) Appl. No.: 18/263,871

(22) PCT Filed: Jan. 5, 2022

(86) PCT No.: PCT/EP2022/050129
§ 371 (c)(1),
(2) Date: Aug. 1, 2023

(87) PCT Pub. No.: WO2022/171368
PCT Pub. Date: Aug. 18, 2022

(65) Prior Publication Data
US 2024/0123982 A1 Apr. 18, 2024

(30) Foreign Application Priority Data
Feb. 15, 2021 (DE) ..................... 10 2021 201 410.0

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 60/001* (2020.02); *G01C 21/3415* (2013.01); *G05D 1/622* (2024.01)

(58) Field of Classification Search
CPC ............. B60W 30/0956; B60W 30/09; B60W 60/001; B60W 2554/4042;
(Continued)

(56) References Cited

U.S. PATENT DOCUMENTS 11,636,307 B2 * 4/2023 Urtasun ............. G01C 21/3626 701/25
11,755,018 B2 * 9/2023 Zeng ...................... G01C 21/32 701/23
(Continued)

FOREIGN PATENT DOCUMENTS

CN 103823466 A 5/2014
CN 112269381 A 1/2021
(Continued)

OTHER PUBLICATIONS

International Search Report for PCT/EP2022/050129, Issued Apr. 4, 2022.
(Continued)

*Primary Examiner* — Russell Frejd
*Assistant Examiner* — Ana D Thomas
(74) *Attorney, Agent, or Firm* — NORTON ROSE FULBRIGHT US LLP

(57) ABSTRACT

A method for ascertaining a direction of travel and/or a future path of travel of a robot and/or a vehicle, movable at least semiautonomously or autonomously in a dynamically changeable surrounding area. The method includes: measuring and/or ascertaining surrounding-area parameters, which may each be assigned to at least one moving, external object in the area surrounding the unit; executing at least one
(Continued)

movement prediction algorithm for ascertaining, in each instance, at least one probabilistic movement prediction parameter for detected external objects as a function of measured surrounding-area parameters assigned to the individual external objects; executing at least one movement determination algorithm for ascertaining at least one short-term movement parameter for each detected external objects as a function of measured surrounding-area parameters assigned to the individual external objects; the movement prediction algorithm and the movement determination algorithm being executed at least substantially independently of each other.

15 Claims, 3 Drawing Sheets

(51) Int. Cl.

| | |
|---|---|
| ***B60W 60/00*** | (2020.01) |
| ***G01C 21/34*** | (2006.01) |
| ***G05D 1/622*** | (2024.01) |

(58) Field of Classification Search

CPC ...... B60W 2554/801; B60W 2554/802; G01C 21/3415; G05D 1/622; G05D 1/0214

See application file for complete search history.

(56) References Cited

U.S. PATENT DOCUMENTS

| | | | | |
|---|---|---|---|---|
| 11,835,951 | B2 * | 12/2023 | Djuric | B60W 60/00274 |
| 2012/0316725 | A1 | 12/2012 | Trepagnier et al. | |
| 2019/0152490 | A1 * | 5/2019 | Lan | B60W 50/0097 |

FOREIGN PATENT DOCUMENTS

| | | | |
|---|---|---|---|
| DE | 102007037610 | A1 | 2/2009 |
| DE | 102008049824 | A1 | 4/2010 |
| DE | 102014201382 | A1 | 7/2015 |
| DE | 102015206335 | A1 | 10/2016 |

OTHER PUBLICATIONS

Brito et al., "Model Predictive Contouring Control for Collision Avoidance in Unstructured Dynamic Environments," IEEE Robotics and Automation Letters, IEEE, vol. 4, No. 4, 2019, pp. 1-8. <https://www.autonomousrobots.nl/docs/19-brito-ral.pdf> Downloaded Jul. 31, 2023.

* cited by examiner

METHOD FOR ASCERTAINING A DIRECTION OF TRAVEL OF AN AT LEAST SEMIAUTONOMOUSLY OR AUTONOMOUSLY MOVABLE UNIT, AND DEVICE OR SYSTEM

SUMMARY

According to an example embodiment of the present invention, a method is provided for ascertaining a direction of travel of a unit, in particular, a robot and/or a vehicle, movable at least semiautonomously or autonomously in a dynamically changeable surrounding area; the method including at least the following steps:

- measuring and/or ascertaining a plurality of surrounding-area parameters, which may each be assigned to at least one moving, external object in the area surrounding the unit;
- executing at least one movement prediction algorithm for ascertaining, in each instance, at least one probabilistic movement prediction parameter for detected external objects as a function of measured surrounding-area parameters assigned to the individual external objects;
- executing at least one movement determination algorithm for ascertaining, in each instance, at least one short-term movement parameter for detected external objects as a function of measured surrounding-area parameters assigned to the individual external objects;

the movement prediction algorithm and the movement determination algorithm being executed at least substantially independently of each other, in order to ascertain a future direction of travel of the unit.

That "the movement prediction algorithm and the movement determination algorithm are executed at least substantially independently of each other," is to be understood to mean, in particular, that input parameters and output parameters of the two algorithms are independent of each other. The movement prediction algorithm and the movement determination algorithm are preferably executed temporally independently of each other; in particular, the movement prediction algorithm and the movement determination algorithm also being able to be executed simultaneously. In particular, it is possible for the movement prediction algorithm and the movement determination algorithm to use the same input parameters. Input parameters of the movement prediction algorithm or of the movement determination algorithm are preferably independent of output parameters of, in each instance, the other algorithm to be executed at least substantially simultaneously, in particular, the movement determination algorithm or the movement prediction algorithm. It is possible for the movement prediction algorithm and the movement determination algorithm to be executed by a single processing unit of a control and/or regulating unit, or to be executed individually by at least two different processing units of a control and/or regulating unit or the like. The movement prediction algorithm and the movement determination algorithm are preferably executed periodically, in particular, during operation, control planning, and or a movement of the unit. Preferably, the movement determination algorithm and the movement prediction algorithm are each configured to determine a future path of travel of the unit through the surrounding area. In particular, "configured" is to be understood as specially programmed and/or specially designed. That an object is configured for a particular function, is to be understood to mean, in particular, that the object fulfills and/or executes this particular function in at least one application state and/or operating state. In particular, the future path of travel of the unit is ascertained over the direction of travel. The future path of travel of the unit preferably takes the form of a movement, preferably a change in movement and/or a constant movement, of the unit in a future time interval. Preferably, the future path of travel of the unit may also include merely a rotation of the unit and/or a standstill of the unit in the future time interval. In particular, the movement determination algorithm is configured to ascertain a necessity of definitive and/or direct control of the unit, for instance, emergency braking and/or an evasive maneuver. The movement determination algorithm is preferably configured to output a plurality of short-term movement parameters, which are each assigned, in particular, to an external object of a plurality of detected external objects. The movement prediction algorithm is preferably configured to ascertain a plurality of possible future paths of travel, which, in particular, are not yet able to be predicted clearly, however.

A "surrounding-area parameter" is to be understood as, in particular, a parameter, which may be measured in the area surrounding the unit and/or surrounding a detection unit. In particular, the surrounding-area parameters each take the form of a physical characteristic of an external object in the surrounding area, which is associated with, in particular, a movement of the external object. In particular, the surrounding area is checked for external objects with the aid of the detection unit. External objects are preferably detected within a maximum detecting range in the area surrounding the unit and/or surrounding the detection unit; in particular, for each external object detected, in each instance, at least one surrounding-area parameter being ascertained, which is preferably assigned to the respective external object. It is possible for only moving external objects to be detected and/or determined with the aid of the detection unit; in each instance, only moving, external objects being assigned surrounding-area parameters. It is particularly preferable for the detection unit to be configured to measure a plurality of different surrounding-area parameters. Alternatively, or in addition, the detection unit and/or the control and/or regulating unit is configured to ascertain the plurality of different surrounding-area parameters from data acquired by the detection unit. Preferably, the surrounding-area parameters each take the form of a direction of movement of an external object, a spatial variable of an external object, a mass of an external object, a velocity of an external object, an acceleration of an external object, or the like. It is also possible for surrounding-area parameters to take the form of parameters of a relative movement of an external object and the unit, such as a velocity, an acceleration, or the like. At least one measured surrounding-area parameter of a detected external object preferably takes the form of a distance of the respective external object from the detection unit and/or, in particular, from the unit, if the detection unit is separate from the unit. It is particularly preferable for the surrounding-area parameters to be measured continuously or periodically with the aid of the detection unit. All of the measured surrounding-area parameters are preferably utilized for executing the movement prediction algorithm and/or for executing the movement determination algorithm; the surrounding-area parameters preferably having been measured within a predefined time interval. The time interval is preferably given by a duration, that is, an interval between two consecutive iterations of the movement prediction algorithm and/or the movement determination algorithm.

A "probabilistic movement prediction parameter" is to be understood as, in particular, a parameter of an external object, which describes at least one possible future path of travel of the external object in space and/or in the surrounding area. For each detected, in particular, moving, external object, in each instance, a plurality of probabilistic movement prediction parameters, in particular, a plurality of possible future paths of travel of the external object, are preferably ascertained with the aid of the movement prediction algorithm. For each detected, in particular, moving, external object, in each instance, exactly one most probable future path of travel is preferably selected from a plurality of possible future paths of travel of the external object with the aid of the movement prediction algorithm. A "short-term movement parameter" is to be understood as, in particular, a parameter of an external object, which describes a path of travel of the external object in a directly subsequent time interval, in particular, a short-term interval, preferably, within not more than 10 s, preferably, not more than 5 s, and especially, not more than 2 s. It is preferable for the at least one short-term movement parameter to be able to be calculated clearly, using a physical computational model, in particular, within the scope of kinematics, and, in particular, to not take the form of a stochastic variable. In particular, the possible future paths of travel, which are described, using the probabilistic movement prediction parameters, are generated completely within a time interval of more than 20 s, preferably, more than 30 s, and preferentially, more than 40 s. In particular, the short-term movement parameter includes a plurality of positions of the unit in space, on the future path of travel of the unit, within the short-term interval. A "short-term interval" is to be understood as, in particular, a time interval of not more than 10 s, preferably, not more than 5 s, and especially, not more than 2 s. A short-term interval is preferably a time interval, in which an external object traces a path of travel inevitably, in particular, in dependently of normal controlling forces and/or normal external influences, as a function of surrounding-area parameters of the external object. For example, a vehicle, which moves at a certain velocity, has a certain path of travel, which is traced by the vehicle independently of possible, normal influences, such as braking of a driver of the vehicle and/or a normal steering maneuver on the road traveled on by the vehicle; a short-term interval for the external object taking the form of the vehicle being a time interval, in which the vehicle covers this path of travel. Alternatively, it is possible for a length of the short-term interval to be specified and stored in the control and/or regulating unit for executing the movement determination algorithm. For detected external objects, the movement prediction algorithm is preferably configured to ascertain, in each instance, at least one possible future path of travel for a future time frame of at least 10 s, preferably, at least 15 s, and especially, at least 20 s. In particular, "configured" is to be understood as specially programmed, specially designed and/or specially equipped. That an object is configured for a particular function, is to be understood to mean, in particular, that the object fulfills and/or executes this particular function in at least one application state and/or operating state.

The method is preferably configured to dynamically determine a direction of travel of the unit, in particular, for a future path of travel of the unit, and/or a future path of travel of the unit, as a function of external objects detected in the surrounding area, in particular, measured surrounding-area parameters of the external objects, particularly preferably, as a function of ascertained paths of movement of the detected external objects, preferably for autonomous control of the unit within the surrounding area. The method, in particular, the movement prediction algorithm and the movement determination algorithm, is preferably executed by the control and/or regulating unit, which takes the form of a part of the unit at least partially or completely or is formed outside of the unit, for example, as part of a network, a cloud, or the like. The method preferably takes the form of a computer-implemented method at least partially, in particular, with the exception of detecting the external objects and/or measuring the surrounding-area parameters. Each detected external object is preferably assigned at least one measured surrounding-area parameter with the aid of the detection unit and/or the control and/or regulating unit. The detected external objects and the measured surrounding-area parameters are preferably transmitted by the detection unit at least substantially directly to the at least one control and/or regulating unit. Data regarding the detected external objects, such as position, type, state of movement, or the like, as well as surrounding-area parameters assigned to the respective external object, are each combined to form a data set, preferably for executing the movement prediction algorithm and/or the movement determination algorithm. Preferably, the movement prediction algorithm and the movement determination algorithm are each executed, using a plurality of data records, and/or for a plurality of detected external objects. All of the external objects detected in a predefined time frame prior to execution of the movement prediction algorithm and/or the movement determination algorithm, or a filtered subset of all of the external objects detected in the predefined time frame prior to execution of the movement prediction algorithm and/or the movement determination algorithm, are preferably taken into account for executing the movement prediction algorithm and/or the movement determination algorithm.

For example, a plurality of external objects in the surrounding area of the unit are detected with the aid of the detection unit. Surrounding-area parameters are preferably ascertained and/or measured for each detected external object with the aid of the detection unit and/or the control and/or regulating unit. For example, a position relative to the unit and/or a distance from the unit, a direction of movement, and a velocity are measured and/or ascertained as surrounding-area parameters for each detected object. In particular, a position of an external object relative to the unit is ascertained, using a position of the external object within an image plane of the detection unit, and using a distance measurement of the external object. In particular, a velocity of an external object is ascertained by comparing two images of the external object recorded one after the other in time; preferably, a distance traveled within a time interval occurring between the two recorded images being ascertained. For example, a direction of movement of a detected external object is ascertained by comparing two positions of the external unit determined temporally one after the other. A future path of travel of the external object within a specified short-term interval is preferably ascertained by the movement determination algorithm, for each of the detected external objects, with the aid of, in each instance, the surrounding-area parameters assigned to the respective external object. For each of the detected external objects, using the movement prediction algorithm, at least one, in particular, a plurality of, possible future path(s) of travel of the specific external object are preferably ascertained for each of the detected external objects with the aid of, in each instance, the surrounding-area parameters assigned to the respective external object; for each possible future path of travel ascertained, a probability of the respective external object taking the ascertained, possible future path of travel being preferably determined. It is possible for the at least one probabilistic movement prediction parameter to be ascertained, using the movement prediction algorithm, and/or for the at least one short-term movement parameter to be ascertained, using the movement determination algorithm, with the aid of a machine learning method, in particular, a neural network; in particular, a database or a cloud including a plurality of stored surrounding-area parameters and/or previous determination procedures being taken into consideration and evaluated. It is particularly preferable for an ascertained probabilistic movement prediction parameter of an external object to differ from an ascertained short-term movement parameter of the external object, preferably as a function of a situation between the unit and the external object. The direction of travel and/or a future path of travel of the unit is preferably ascertained as a function of the ascertained probabilistic movement prediction parameter and the ascertained short-term movement parameter.

The embodiment of the method according to the present invention may allow a unit controlled at least semiautonomously, in particular, autonomously, to be controlled advantageously rapidly, accurately, and reliably, in particular, in hazardous situations, where movements of external objects relative to the unit endanger the unit immediately and unavoidably. An advantageously rapid reaction of the unit to spontaneous events in the surrounding area of the unit may be enabled, since, preferably, data relevant to them may be ascertained separately, using the short-term movement parameter. An advantageously low computing expenditure for executing the movement determination algorithm and, consequently, advantageously rapid execution of individual runs of the movement determination algorithm, may be enabled, since, in particular, probabilistic analyses of external objects may be made independently of a determination of the short-term movement parameters.

In addition, it is provided that the method include at least one step occurring, in particular, subsequently to the movement determination algorithm, in which at least one emergency collision prevention algorithm is executed, which takes the form of, in particular, model predictive control of the unit; emergency control, in particular, emergency braking and/or an evasive movement of the unit, being carried out with the aid of the emergency collision prevention algorithm, if a, in particular, virtual, spacing of a position of the unit on the future path of travel and a future position of an external object ascertained as a function of an ascertained short-term movement parameter, falls below a predefined limiting value at at least one instant. An advantageously rapid control response of the unit, in particular, as a function of the short-term movement parameter, may be rendered possible. An advantageously high level of safety may be attained during the autonomous control of the unit. It is possible for the movement determination algorithm and the emergency collision prevention algorithm to be executed together, preferably, in succession, and/or to be integral. In particular, the emergency collision prevention algorithm is configured to counteract an imminent collision of the unit with an external object, using the emergency control of the unit, and/or to preferably prevent this at least substantially. Preferably, at least one short-term movement parameter of the unit, which preferably describes a movement of the unit within a directly subsequent short-term interval, is determined by the emergency collision prevention algorithm. At least one movement parameter of the unit is preferably retrieved for determining the at least one short-term movement parameter of the unit. The movement parameter of the unit is preferably retrieved with the aid of the control and/or regulating unit, in particular, the processing unit, via a control unit situated on the unit, via a drive unit of the unit, via the detection unit, or via another sensor unit for measuring and/or ascertaining the movement parameter of the unit. In particular, the at least one movement parameter of the unit is retrieved periodically or continuously; in particular, the movement parameter of the unit, which is utilized for the emergency collision prevention algorithm, being transmitted prior to a determination of the short-term movement parameter of the unit. A "movement parameter" is to be understood as, in particular, a parameter of a body, in particular, of the unit, which describes a, in particular, current movement of the body in space. For example, the movement parameter takes the form of a direction of movement of the unit in space, a velocity of the unit, a mass of the unit, such as an unladen weight and/or a gross weight of the unit, or the like. The short-term movement parameter of the unit is preferably determined as a function of the movement parameter of the unit. The short-term movement parameter of the unit preferably takes the form of a future path of travel of the unit in a short-term interval. Using the emergency collision prevention algorithm, the position of the unit on the future path of travel of the unit is preferably compared to a plurality of future paths of travel of the detected external objects determined as a function of ascertained short-term movement parameters. In particular, a minimum spacing of the unit and the individual external objects is ascertained by the emergency collision prevention algorithm for each instant of the paths of travel taken into consideration. With the aid of the emergency collision prevention algorithm, an output signal for triggering a control unit of the unit, in particular, for carrying out the emergency control, is preferably outputted, if at least one ascertained minimum spacing of the unit and an individual external object falls below the at least one predefined limiting value. For example, in the case of assembly, initial operation, or maintenance of the device, the at least one predefined limiting value is preferably stored in the control and/or regulating unit. Alternatively, or in addition, it is possible for the control and/or regulating unit to request the at least one predefined limiting value periodically from at least one external unit. A plurality of predefined limiting values to retrieve for comparison are preferably stored in the control and/or regulating unit. It is possible for, in each instance, exactly one predefined limiting value to be selected for comparison, as a function of a type of specific external object considered, as a function of a current velocity of the unit and/or the external object, or the like. For example, for an external object taking the form of a shrub, which is identified, e.g., with the aid of the detection unit, and/or at a velocity of the unit of less than 1 m/s, then, with the aid of the control and/or regulating unit, a lower specified limiting value is selected from a plurality of limiting values than in the case of an external object taking the form of a vehicle, given the same speed.

In addition, according to an example embodiment of the present invention, it is provided that the method include at least one step, which is carried out, in particular, subsequently to the movement prediction algorithm, and in which at least one pathfinding algorithm, in particular, a theta* pathfinding algorithm, is executed; with the aid of the pathfinding algorithm, a future path of travel of the unit being determined dynamically as a function of the ascertained probabilistic movement prediction parameters of the detected external objects. Preferably, probability-oriented route planning of the unit may be enabled independently of a reaction to spontaneous, hazardous situations, in particular, by the emergency collision prevention algorithm, and/or without slowing a response to spontaneous, hazardous situations, in particular, the emergency collision prevention algorithm. It is possible for the movement prediction algorithm and the pathfinding algorithm to be executed together, preferably in succession, or to be formed integrally. A plurality of probabilistic movement prediction parameters of the, in particular, of all of the, detected external objects, are preferably taken into consideration for executing the pathfinding algorithm. For the pathfinding algorithm, for each external object detected, the probabilistic movement prediction parameter, which has, in each instance, the highest ascertained probability of the respective external object's continuing in its direction, is preferably taken into consideration. A future path of travel of the unit within the surrounding area is preferably ascertained with the aid of the pathfinding algorithm. In order to execute the pathfinding algorithm, in particular, at least one target position and/or an optimum path of travel of the unit into/through the surrounding area is specified, such as the most rapid route of the unit to a destination, in particular, within a known road network and/or within a known operating range of the unit, such as a garden or the like. It is also possible for the unit to be intended for executing an action; the future path of travel being ascertained by the pathfinding algorithm in such a manner, that, for example, the future path of travel of the unit intersects, as much as possible, a region of the surroundings to be processed, for example, in the case of an embodiment of the unit in the form of a lawn mower. "Intended" is to be understood as, in particular, specially configured and/or specially equipped. That an object is intended for a particular function, is to be understood to mean, in particular, that the object fulfills and/or executes this particular function in at least one application state and/or operating state. In particular, the pathfinding algorithm takes the form of a customary probabilistic control algorithm used for controlling a unit movable semiautonomously or autonomously. For example, for all of the detected external objects, in each instance, at least one probabilistic movement prediction parameter taking the form of the most probable future path of travel of the respective external object is ascertained by the movement prediction algorithm; with the aid of the pathfinding algorithm, a future path of travel of the unit being ascertained as a function of the most probable future paths of travel of the individual objects ascertained. The future path of travel of the unit is preferably ascertained in such a manner, that a collision or an approach of the unit with/by one of the external objects is prevented. For example, the future path of travel of the unit is ascertained with the aid of the pathfinding algorithm in such a manner, that at all times, the unit does not fall below a predefined limiting spacing value for a minimum spacing of an external object and the unit. For example, in the case of assembly, initial operation, or maintenance of the device, the predefined limiting spacing value in the control and/or regulating unit is preferably stored in the control and/or regulating unit. Alternatively, or in addition, it is possible for the control and/or regulating unit to request the at least one predefined limiting spacing value periodically from at least one external unit. A plurality of predefined limiting spacing values to utilize for the pathfinding algorithm are preferably stored in the control and/or regulating unit. It is possible for, in each instance, exactly one predefined limiting spacing value to be selected for the pathfinding algorithm as a function of a type of specific external object considered, as a function of a current velocity of the unit and/or the external object, or the like. The pathfinding algorithm is preferably implemented at least partially in a cost function map (cost map), which weights positions of the unit on a possible path of travel of the unit, in a close range of external objects, higher than outside of the close range, in order to ascertain a future path of travel. Possible paths of travel of the unit are preferably weighted with the aid of the pathfinding algorithm, in order to ascertain a future path of travel of the unit as a function of a proximity to at least one external object at a time during a future movement of the unit along the possible path of travel. Alternatively, or in addition, it is possible for at least one short-term movement parameter ascertained by the movement determination algorithm to be utilized as an input parameter for the pathfinding algorithm.

In addition, according to an example embodiment of the present invention, it is provided that in at least one step, the movement determination algorithm and/or the emergency collision prevention algorithm for ascertaining a future path of travel and/or the direction of travel of the unit as a function of the detected external objects, be considered at a higher priority than the movement prediction algorithm and/or the pathfinding algorithm. An advantageously high level of safety during the control of the unit may be rendered possible by the method. In particular, in response to the attainment of a maximum computing power of the processing unit(s), to an error message of the detection unit and/or the control and/or regulating unit, to a detected, spontaneous approach of an external object, or the like, the movement determination algorithm and/or the emergency collision prevention algorithm is executed at a higher priority than the movement prediction algorithm and/or the pathfinding algorithm. Preferably, at least one control signal is transmitted to a drive unit of the device by the control and/or regulating unit as a function of an output parameter of the pathfinding algorithm, preferably for a movement along the ascertained, future path of travel. At least one control signal is preferably transmitted to a drive unit of the unit by the control and/or regulating unit as a function of an output parameter of the emergency collision prevention algorithm, preferably for executing the emergency control. It is particularly preferable for a control signal generated as a function of an output parameter of the emergency collision prevention algorithm to be outputted by the control and/or regulating unit and/or executed by the drive unit at a higher priority than a control signal generated as a function of an output parameter of the pathfinding algorithm. It is possible for a control signal generated as a function of an output parameter of the emergency collision prevention algorithm to overwrite and/or replace a control signal, which is transmitted, in particular, simultaneously or previously, and generated as a function of an output parameter of the pathfinding algorithm. A movement along an ascertained future path of travel is preferably interrupted by the drive unit to execute emergency control, if a control signal generated as a function of an output parameter of the emergency collision prevention algorithm is transmitted to the drive unit and/or received by the drive unit.

In addition, according to an example embodiment of the present invention, the method may include at least one step, in particular, the step of executing the movement determination algorithm, in which a number, in particular, other than one, of short-term movement parameters or of values of a short-term movement parameter, is ascertained, in particular, inversely proportionally, for the respective external object as a function of a number and/or a type of different measured surrounding-area parameters of the individual external objects. Possible hazardous situations in the case of uncertainties in the detection of an external object may be compensated for in an advantageous manner. For example, different scenarios for a movement of an external object within a short, future time interval may be taken into account in an advantageous manner, if the external object, in particular, a movement and/or position of the external object, is not able to be measured sufficiently accurately. For example, it is possible for only a limited number of surrounding-area parameters to be measured and/or ascertained for individual, detected external objects. For example, only one direction of movement is ascertained for a single detected external object; however, for example, due to disruptive effects during measurement and/or due to errors, a velocity of the external object is not able to be ascertained. Due to that, in particular, an accurate future path of travel within a short-term interval and/or a short-term interval for the external object, is not able to be ascertained. For individual external objects, it is possible for more than one short-term movement parameter to be ascertained as a function of a lack of, or a number of missing, surrounding-area parameters needed for a future path of travel, using the movement determination algorithm. For the emergency collision prevention algorithm, in particular, to ascertain a need for emergency control, all short-term movement parameters for a single detected external object ascertained via the movement determination algorithm are preferably taken into account.

In addition, according to an example embodiment of the present invention, it is provided that the method include at least one step, in particular, the step of executing the movement determination algorithm, in which at least one short-term movement parameter of a detected external object is ascertained as a purely deterministic variable as a function of measured surrounding-area parameters of the external object, in particular, exclusively with the aid of a stored physical computational model. Advantageously accurate and reliable control of the unit is rendered possible with the aid of the movement determination algorithm. Preferably, unintentional and unnecessary control maneuvers of the unit, in particular, in situations, where there is no risk of a collision with an external object, may be advantageously prevented. It is preferable for a short-term movement parameter of an individual external object to describe, in each instance, a future path of travel of the external object within a short-term interval. To ascertain the short-term movement parameters, using the movement determination algorithm, preferably, only measured and/or ascertained surrounding-area parameters are taken into consideration, and no probabilistic parameters, such as a probability distribution for a velocity or the like, of the external object. Preferably, a "probabilistic parameter" is to be understood as a parameter, which is ascertained at a level of uncertainty of less than 90%, and/or for which more than one value is ascertained; the individual ascertained values each being weighted by at least one probability. In each instance, short-term movement parameters ascertained by the movement determination algorithm preferably take the form of at least one future position and/or path of travel of an external object calculated, preferably, within the short-term interval, in particular, using the stored physical computational model.

In addition, according to an example embodiment of the present invention, it is provided that the method include at least one step, in which all of the detected external objects are filtered for moving or mobile external objects; in particular, in the case of executing the movement determination algorithm, only surrounding-area parameters associated with moving or mobile external objects being taken into consideration for ascertaining short-term movement parameters. Advantageously rapid execution of the movement determination algorithm may be enabled, in particular, since a number of parameters to be considered may be reduced by filtering the external objects. Consideration of immobile or non-moving objects by the movement prediction algorithm is preferably adequate for the safe control of the unit, which is why, in particular, the filtering of the external objects is advantageous for the movement determination algorithm. For detected external objects, in each instance, a position of the individual external objects is preferably measured over a predefined, elapsed time frame; in each instance, external objects, which have not moved relative to the unit and/or in space within the predefined time frame, not being taken into account for executing the movement determination algorithm. All of the detected external units to be considered for executing the movement determination algorithm are preferably filtered for external objects moving within the predefined time frame. It is possible for the predefined time frame to be determined dynamically as a function of a minimum distance of the individual external objects from a position of the unit in space and/or on a future path of travel of the unit. For example, for external objects in a close range of the unit and/or a future path of travel of the unit, in each instance, a larger predefined time frame is selected than for external objects, which are situated outside of the close range of the unit and/or of a future path of travel of the unit. It is also possible for external objects in the/a close range of the unit and/or a future path of travel of the unit to be considered independently of a movement of these external objects in space, for executing the movement determination algorithm. Persons and/or objects controlled by persons are preferably detected and/or distinguished among the detected external objects by the detection unit and/or the control and/or regulating unit. In one step, it is possible for all of the detected external objects or the filtered, moving external objects to be filtered for persons and/or objects controlled by persons; in particular, in the case of executing the movement determination algorithm, only surrounding-area parameters associated with the filtered external objects being taken into consideration for ascertaining short-term movement parameters. Alternatively, or in addition, it is possible for a virtual map of a surrounding area of a unit, such as a space or building to be driven through by the unit, a garden or the like to be driven through by the unit, or other reference data about the surrounding area, to be stored in the control and/or regulating unit, preferably by a user, in the case of initial operation, in the case of maintenance, and/or during operation. With the aid of the detection unit and/or the control and/or regulating unit, in particular, to ascertain a direction of travel and/or a future path of travel of the unit, it is possible for only external objects to be detected and/or ascertained, or for surrounding-area parameters of detected external objects to be measured and/or ascertained, which differ from the stored virtual map and/or are not included in the virtual map or the other stored reference data about the surrounding area. For example, a number of external objects to be considered during the execution of the movement prediction algorithm and/or the movement determination algorithm may be advantageously reduced, in particular, since static objects in the surrounding area of the unit, such as walls, trees, barriers, road signs, buildings, or the like, may be filtered rapidly and simply out of a group of external objects to be considered. In particular, detected external objects are recognized and/or identified, in particular, for comparison with objects of the virtual map or the other stored reference data about the surrounding area, using conventional image processing methods and/or pattern recognition methods conventional to one skilled in the art.

In addition, according to an example embodiment of the present invention, the method may include at least one step, in which at least one short-term movement parameter of an external object ascertained, using the movement determination algorithm, is utilized to ascertain a surrounding-area parameter of the external object. The future path of travel of external objects and/or of the unit may be ascertained advantageously accurately and dynamically by the movement prediction algorithm, preferably without slowing down execution of the movement determination algorithm. Short-term movement parameters ascertained by the movement determination algorithm are preferably stored in the control and/or regulating unit. In particular, at least one stored short-term movement parameter, which is assigned to an external object, is utilized for ascertaining a surrounding-area parameter of the external object. Stored short-term movement parameters, which are each assigned to one external object, are preferably utilized as surrounding-area parameters, in particular, for executing the movement determination algorithm and/or for executing the movement prediction algorithm. In addition to measured and/or ascertained surrounding-area parameters, it is alternatively possible for stored short-term movement parameters to be taken into account for executing the movement determination algorithm and/or for executing the movement prediction algorithm. Ascertained and stored short-term movement parameters of an external object are preferably used for tracing back a path traveled by the external object, for example, for ascertaining a surrounding-area parameter and/or for identifying the external object or the like.

In addition, according to an example embodiment of the present invention, the movement determination algorithm and the movement prediction algorithm may be executed in a periodically repeated manner; the movement determination algorithm being executed at a higher frequency than the movement prediction algorithm. An advantageously high level of safety may be attained during the, in particular, autonomous, control of the unit. It is possible for a frequency of execution of the movement prediction algorithm to be adjusted dynamically, for example, as a function of a movement and/or positions of detected external objects, in particular, relative to the unit, as a function of a control command by an operator or by a system outside of the unit, as a function of the detection of new external objects not detected previously, or the like. The frequency of the movement determination algorithm is preferably not changed during operation of the unit. A frequency of execution of the movement determination algorithm by the control and/or regulating unit preferably corresponds to at least 10 Hz, preferably, at least 50 Hz, and especially, at least 100 Hz. A frequency of execution of the movement prediction algorithm by the control and/or regulating unit is preferably at least 0.5 Hz, preferably, at least 1 Hz, and especially, at least 5 Hz.

In addition, according to an example embodiment of the present invention, a device or a system having at least one, in particular, the above-mentioned, processing unit is proposed, which is configured to implement a method of the present invention for ascertaining a direction of travel of the unit in a dynamically changeable surrounding area.

In one preferred embodiment of the device or of the system of the present invention, the unit includes the detection unit and/or the at least one control and/or regulating unit. In particular, the processing unit takes the form of part of the control and/or regulating unit. A "control and/or regulating unit" is to be understood as, in particular, a unit having at least one piece of control electronics. "Control electronics" are to be understood as, in particular, a unit having a, in particular, the above-mentioned, processing unit taking the form of a processor, FPGA, microcontroller, or the like; and having a storage unit, in particular, taking the form of a physical storage device, a virtual storage device, a data storage unit, such as a hard disk, a removable storage medium or a solid-state memory, or the like; and having a computer program stored in the storage unit. In addition, it is proposed that the device take the form of a, in particular, the above-mentioned, semiautonomously or autonomously movable unit, in particular, a robot. For example, the unit takes the form of a vehicle, a logistics robot for transporting goods and material, a drone such as a monitoring drone, a household robot such as a cleaning robot, vacuum robot, or the like, a garden robot such as a mowing robot, a watering robot, or the like. In particular, the unit is movable, preferably drivable, within the surrounding area. It is also possible for the unit to be able to float and/or able to fly. The detection unit is preferably formed to be mobile together with the unit, in particular, formed as part of the unit or being positioned on the unit. It is also possible for the detection unit and/or the control and/or regulating unit to be formed at least partially outside of the unit. For example, it is possible for the unit to include the detection unit; electronic data acquired and/or ascertained by the detection unit, in particular, for determining surrounding-area parameters, being transmitted by the unit to the control and/or regulating unit, in particular, the/a processing unit of the control and/or regulating unit, preferably via a, in particular, wireless, communications unit of the system, in order to execute the movement prediction algorithm and/or to execute the movement determination algorithm. As an alternative, it is possible for the detection unit to be set apart from the unit and to be intended for monitoring the surrounding area of the unit; the communications unit being intended, in particular, for transmitting acquired and/or ascertained electronic data, in particular, for determining surrounding-area parameters, from the detection unit to the control and/or regulating unit, in particular, the/a processing unit of the control and/or regulating unit, in order to execute the movement prediction algorithm and/or to execute the movement determination algorithm. For example, the unit or a plurality of units takes the form of part of the system. Preferably, at least part of the control and/or regulating unit takes the form of part of the unit or is positioned at least partially on the unit, preferably in order to control a motor of the unit as a function of control signals of the processing unit. In particular, it is possible for the processing unit to be formed at least partially separately from the unit, in particular, as part of a different unit of the system, such as a cloud, a neural network made up of a plurality of units and/or devices, a smart home system, or the like. The detection unit includes, in particular, at least one detection element, such as a camera, a lidar sensor, in particular, having at least one laser source and at least one light sensor. The unit preferably includes at least one drive unit and at least one locomotion device, such as a wheel, a rotor, or the like. The drive unit is preferably intended for propelling the locomotion device in at least one motion. The control and/or regulating unit is preferably configured to force the drive unit to cover, preferably, an ascertained future path of travel and/or to execute the emergency control. In particular, the drive unit includes at least one powered, movable steering element for changing a direction of travel of the unit.

According to an example embodiment of the present invention, the detection unit and the control and/or regulating unit is/are preferably configured to monitor the area surrounding the unit and to ascertain the external objects and surrounding-area parameters of the external objects as a function of acquired data. It is possible for a method of mapping the surrounding area and the external objects detected in it to be carried out, using the control and/or regulating unit, in which case, for example, a virtual map of the surrounding area is generated. The detection unit and the control and/or regulating unit is/are preferably configured to identify detected external objects and/or to classify them in subgroups. The detection unit and the control and/or regulating unit is/are preferably configured to recognize and distinguish persons and/or objects controlled by persons, such as bicycles, motor vehicles, or the like. The control and/or regulating unit and/or the processing unit is/are preferably configured to execute the movement prediction algorithm and the movement determination algorithm, preferably independently of each other. The control and/or regulating unit and/or the processing unit is/are configured to execute the emergency collision prevention algorithm and/or the pathfinding algorithm, preferably independently of each other.

The embodiment of the device or the system according to the present invention may allow advantageously rapid, accurate, and reliable, in particular, autonomous, control, in particular, in hazardous situations, where movements of external objects relative to the unit endanger the unit directly and unavoidably. An advantageously rapid reaction to spontaneous events in the surrounding area of the unit may be enabled, since, preferably, data relevant to them may be ascertained separately, using the short-term movement parameter. An advantageously low computing expenditure for executing the movement determination algorithm and, consequently, advantageously rapid execution of individual runs of the movement determination algorithm, as well, may be enabled, since, in particular, probabilistic analyses of external objects may be made independently of a determination of the short-term movement parameters.

In addition, a computer program, in particular, the one mentioned above, is provided, which includes commands that, during the execution of the program by a computer, cause it to implement the method of the present invention.

The embodiment of the computer program according to the present invention may allow advantageously rapid, accurate, and reliable control of a unit controlled at least semiautonomously, in particular, autonomously, in particular, in hazardous situations, where movements of external objects relative to the unit endanger the unit directly and unavoidably. An advantageously rapid reaction of the unit to spontaneous events in the surrounding area of the unit may be enabled, since, preferably, data relevant to them may be ascertained separately, using the short-term movement parameter. An advantageously low computing expenditure for executing the movement determination algorithm and, consequently, advantageously rapid execution of individual runs of the movement determination algorithm, as well, may be enabled, since, in particular, probabilistic analyses of external objects may be made independently of a determination of the short-term movement parameters. Execution of the method in other customary processing units may be enabled.

In addition, a computer-readable medium is provided, which includes commands that, in response to execution by a computer, cause it to implement the method of the present invention. In particular, the medium includes the above-mentioned storage unit.

The embodiment of the medium according to the present invention may allow a unit controlled at least semiautonomously, in particular, autonomously, to be controlled advantageously rapidly, accurately, and reliably, in particular, in hazardous situations, where movements of external objects relative to the unit endanger the unit directly and unavoidably. An advantageously rapid reaction of the unit to spontaneous events in the surrounding area of the unit may be enabled, since, preferably, data relevant to them may be ascertained separately, using the short-term movement parameter. An advantageously low computing expenditure for executing the movement determination algorithm and, consequently, advantageously rapid execution of individual runs of the movement determination algorithm, as well, may be enabled, since, in particular, probabilistic analyses of external objects may be made independently of a determination of the short-term movement parameters.

In this connection, the method of the present invention and/or the device or system of the present invention shall not be limited to the use and specific embodiment described above. In particular, in order to achieve a functionality described here, the method of the present invention and/or the device or system of the present invention may have a number of individual elements, component parts and units, as well as method steps, different from a number mentioned here. In addition, in the ranges of values indicated in this description, values lying within the above-mentioned limits are also to be acknowledged as described and as arbitrarily applicable.

BRIEF DESCRIPTION OF THE DRAWINGS

Further advantages are derived from the following description of figures. An exemplary embodiment of the present invention is depicted in the figures. The disclosure herein includes numerous features in combination. One skilled in the art will necessarily consider the features individually, as well, and unite them to form useful, further combinations.

DETAILED DESCRIPTION OF EXAMPLE EMBODIMENTS

Figure 1:
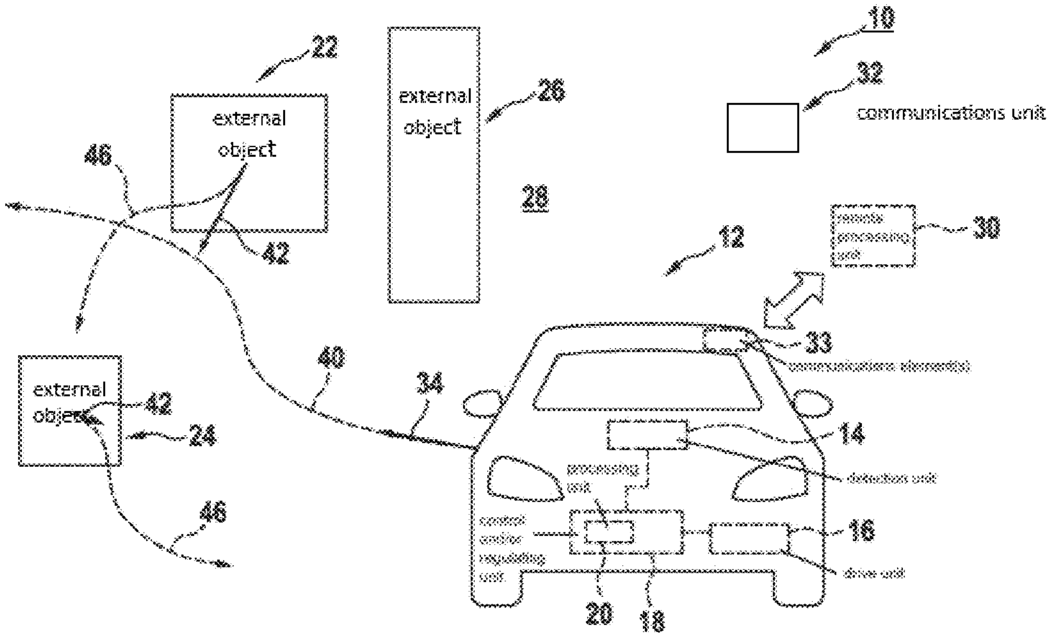
FIG. 1 shows a schematic representation of a system of an example embodiment of the present invention, which includes a semiautonomously movable unit, for carrying out a method of the present invention of controlling the unit in a dynamically changeable surrounding area.

Shown in FIG. 1, is a schematic representation of a system 10, including at least one device taking the form of an autonomously movable unit 12, in particular, an autonomous vehicle, during a movement of unit 12 in a dynamically changeable surrounding area 28. Unit 12 includes a detection unit 14, a drive unit 16, and a control and/or regulating unit 18. Unit 12/the device is intended for carrying out a method 19 of ascertaining a direction of travel and/or a path of travel of unit 12 in dynamically changeable surrounding area 28. In particular, control and/or regulating unit 18 includes a processing unit 20, which takes the form of, in particular, part of system 10. A plurality of external objects 22, 24, 26 are situated in surrounding area 28 of system 10, in particular, of unit 12 or the device; the external objects moving or being positioned statically within surrounding area 28. In particular, unit 12 moves relative to external objects 22, 24, 26. By way of example, two moving external objects 22, 24 and one static external object 26 are shown in FIG. 1. Detection unit 14 is preferably intended for detecting external objects 22, 24, 26 in surrounding area 28. In particular, detection unit 14 includes a camera and a lidar system (not shown individually in the figures). As an alternative to processing unit 20, which takes the form of part of unit 12, it is possible for system 10, in particular, control and/or regulating unit 18, to include a remote processing unit 30, which takes the form of, for example, part of a network, a smart-home system, a cloud, or the like. In particular, system 10 includes a communications unit 32 for communicating wirelessly with remote processing unit 30, with other units or devices of system 10, and/or with external units. Communications unit 32 preferably includes at least one communications element 33, which takes the form of part of unit 12 or is situated on unit 12. Other embodiments of system 10, in particular, of unit 12 and/or of detection unit 14, are also possible. For example, it is possible for unit 12/the device to take the form of a working robot moving semiautonomously or fully autonomously, such as a robot vacuum cleaner, a robot lawn mower, or the like. In addition, it is possible for system 10 to include more than one device and/or more than one unit 12 moving autonomously. Alternatively, or in addition, it is possible for detection unit 14 to be formed separately from unit 12. In an alternative exemplary embodiment of system 10, the device takes the form of a robot, which moves in surrounding area 28; detection unit 14 being situated in or on a working region of the robot and preferably being intended for detecting the robot, as well as external objects 22, 24, 26 in a surrounding area 28 of the robot.

Detection unit 14 is intended for measuring surrounding-area parameters of detected external objects 22, 24, 26. For example, surrounding-area parameters of external objects 22, 24, 26 measured by detection unit 14 take the form of a position of an external object 22, 24, 26 in space, a distance of an external object 22, 24, 26 from detection unit 14, or the like. Control and/or regulating unit 18 is configured to ascertain surrounding-area parameters of external objects 22, 24, 26 as a function of data about external objects 22, 24, 26 acquired by detection unit 14. For example, surrounding-area parameters of external objects 22, 24, 26 ascertained, using control and/or regulating unit 18, take the form of a velocity of an external object 22, 24, 26, a direction of movement of an external object 22, 24, 26, or the like. Surrounding-area parameters, which are each ascertained over more than one image and/or scene recorded by detection unit 14, are preferably ascertained with the aid of control and/or regulating unit 18.

The three different external objects 22, 24, 26 in surrounding area 28 of unit 12 are shown illustratively in FIG. 1. A first external object 22 of the three external objects 26 takes the form of a stationary object; no movement of the first external object 26 being measured. A second external object 22 of the three external objects 22, 24, 26 moves relative to unit 12 and relative to surrounding area 28. For example, a direction of movement 34 and a velocity are ascertained as surrounding-area parameters for second external object 22, using detection unit 14 and control and/or regulating unit 18. In addition, it is possible for a type of external object 22 and/or further additional data about second external object 22 to be additionally ascertained for second external object 22, using detection unit 14 and control and/or regulating unit 18. By comparison of acquired data with at least one data set, it is possible for a vehicle model, an identity of a person, or the like to be identified as additional information about an external object, using, in particular, external processing unit and/or an external unit. For example, it is possible for second external object 22 to be recognized as a vehicle of a certain vehicle model; by identifying the vehicle model, additional information, such as unladen weight, maximum speed, or the like being able to be ascertained as additional surrounding-area parameters. A third external object 24 of the three external objects 22, 24, 26 moves relative to unit 12 and relative to surrounding area 28 and preferably takes the form of a pedestrian.

Control and/or regulating unit 18, in particular processing unit 20, is configured to execute a movement prediction algorithm 36 (cf. FIG. 2) for ascertaining, in each instance, at least one probabilistic movement prediction parameter for detected external objects 22, 24, 26 as a function of measured surrounding-area parameters assigned to individual external objects 22, 24, 26. Control and/or regulating unit 18, in particular processing unit 20, is configured to execute a movement determination algorithm 38 (cf. FIG. 2) for ascertaining, in each instance, at least one short-term movement parameter for detected external objects 22, 24, 26 as a function of measured surrounding-area parameters assigned to individual external objects 22, 24, 26. Control and/or regulating unit 18, in particular, processing unit 20, is configured to execute movement prediction algorithm 36 and movement determination algorithm 38 at least substantially independently from each other, in order to ascertain a future direction of travel and a future path of travel 40 of unit 12, respectively. In at least one step, in order to ascertain future path of travel 40 and/or direction of travel of unit 12 as a function of detected external objects 22, 24, 26, movement determination algorithm 38 is considered by control and/or regulating unit 18, in particular, processing unit 20, at a higher priority than movement prediction algorithm 36.

With the aid of movement determination algorithm 38, control and/or regulating unit 18, in particular, processing unit 20, is preferably configured to ascertain the short-term movement parameter(s) as a purely deterministic variable, using a physical computational model. Control and/or regulating unit 18, in particular, processing unit 20, is preferably configured to filter detected, moving external objects 22, 24, 26 out of detected external objects 22, 24, 26; only external objects 22, 24 moving relative to surrounding area 28 being selected for consideration in movement determination algorithm 38. In this context, for example, first external object 26 would not be considered for movement determination algorithm 38, since it is stationary. However, it is also possible for all detected external objects 22, 24, 26 to be considered for movement determination algorithm 38. In each instance, a short-term movement parameter is ascertained for second external object 22 and third external object 24, using movement determination algorithm 38; each short-term movement parameter preferably corresponding to a path of travel 42, 44 of respective external object 22, 24, which respective external object 22, 24 covers, in particular, independently of steering angles or the like, within a subsequent short-term interval. All detected external objects 22, 24, 26 are considered for movement prediction algorithm 36; in each instance, at least one probabilistic movement prediction parameter, in particular, a plurality of probabilistic movement prediction parameters, being ascertained for each detected external object 22, 24, 26. Preferably, the probabilistic movement prediction parameters each take the form of a possible time characteristic 46, 48 (shown illustratively as paths of travel in FIG. 1) of a future position of respective external object 22, 24, 26, in particular, in a time frame exceeding a short-term interval. It is possible for the probabilistic movement prediction parameters to be ascertained with the aid of movement prediction algorithm 36 as a function of known behavioral patterns, stored traffic rules, or the like. Alternatively, or in addition, it is possible for the probabilistic movement prediction parameters to be ascertained with the aid of movement prediction algorithm 36 as a function of electronic data exchanged with respective external object 22, 24, 26, for example, if respective external object 22, 24, 26 takes the form of another networked and/or autonomous/semiautonomous unit. The ascertained short-term movement parameters are preferably intended for a description of a future movement of an external object 22, 24, 26 in a short-term interval. The ascertained probabilistic movement prediction parameter(s) is/are preferably intended for probabilistic pathfinding for the device/unit 12 in surrounding area 28; in particular, possible future paths of travel of external objects 22, 24, 26 and/or possible time characteristics 46, 48 of a future position of external objects 22, 24, being taken into account.

Figure 2:
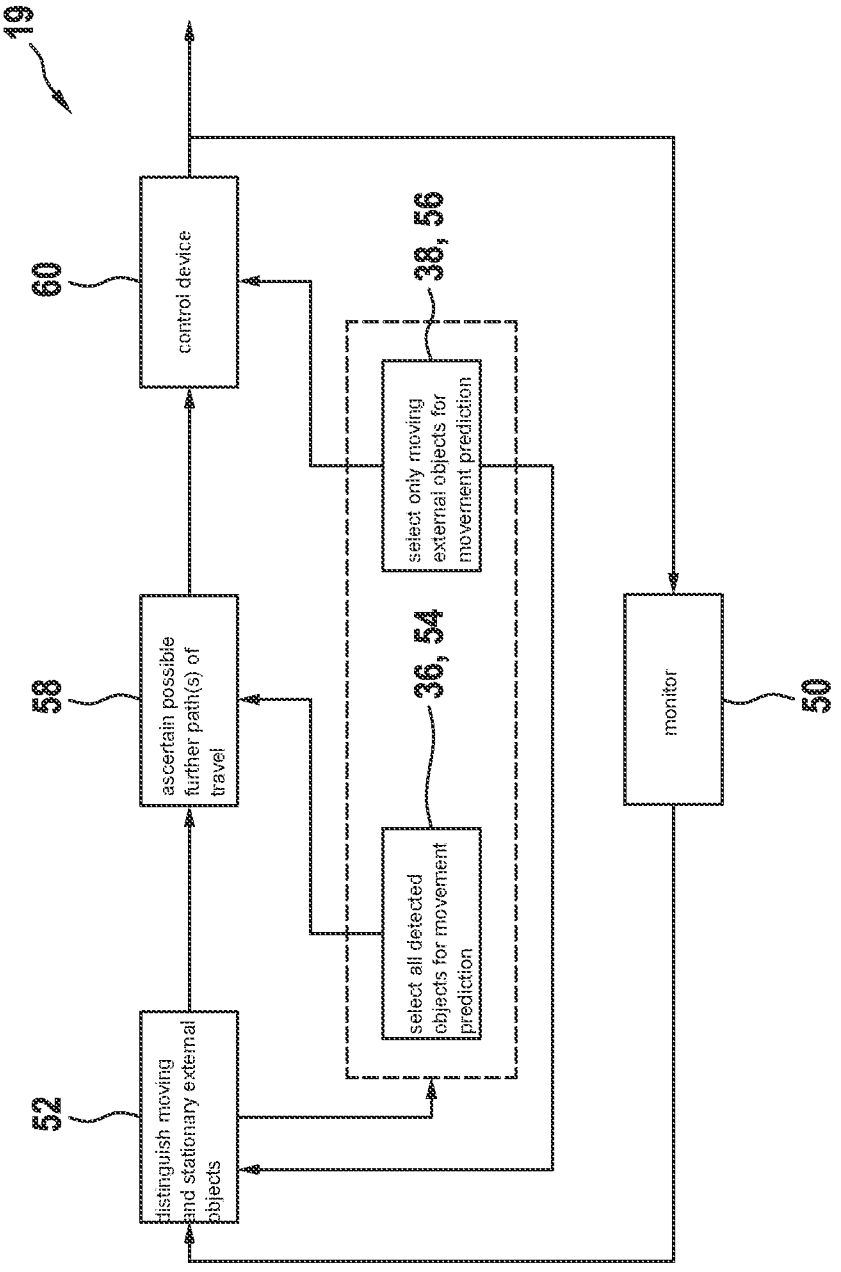
FIG. 2 shows a block diagram of the method of the present invention for controlling the unit of the present invention.

A block diagram of method 19 is shown in FIG. 2. In a step 50, surrounding area 28, as well as external objects 22, 24, 26 in surrounding area 28, are monitored. In addition, movement parameters of unit 12, such as a velocity, a direction of movement, an acceleration, or the like, are measured. In one step, in particular, step 50, the surrounding-area parameters of external objects 22, 24, 26 are ascertained and transmitted to control and/or regulating unit 18. It is also possible for the surrounding-area parameters to be ascertained at least partially or completely by control and/or regulating unit 18, using, in particular, data acquired by detection unit 14. In a further step 52, moving external objects 22, 24 and external objects 26 stationary relative to surrounding area 28 are distinguished. Measured and/or ascertained surrounding-area parameters are transmitted to processing unit 18, which executes movement prediction algorithm 36 and movement determination algorithm 38 independently from each other, in particular, in two further steps 54, 56. Preferably, in step 56, it is possible for only external objects 22, 24 that are moving relative to surrounding area 28 to be selected for movement determination algorithm 38. Preferably, in step 54, it is possible for all detected external objects 22, 24, 26 to be selected for movement prediction algorithm 36. In a further step 58, with the aid of a pathfinding algorithm 64, in each instance, at least one possible future path of travel 40, in particular, in each instance, a plurality of possible future paths of travel 40, of unit 12, is/are ascertained as a function of the probabilistic movement prediction parameters for detected external objects 22, 24, 26 ascertained by movement prediction algorithm 36, and as a function of measured and/or ascertained surrounding-area parameters. In particular, in further step 58, at least one future path of travel 40 of unit 12/the device is ascertained, for example, using a two-dimensional cost map and/or a theta* planning function, as a function of the ascertained probabilistic movement prediction parameters, in particular, ascertained possible future paths of travel 42, 44 of external objects 22, 24, 26. In a further step 60, unit 12/the device is controlled, in particular, using model predictive control (MPC). Unit 12/the device is preferably controlled with the aid of control and/or regulating unit 18 as a function of the at least one ascertained future path of travel 40 of unit 12/the device.

In step 60, an emergency collision prevention algorithm 62 is executed; emergency control 66, in particular, emergency braking and/or an evasive movement, of unit 12 (see FIG. 1, shown by way of example as an evasive maneuver, using the steering angle) being carried out, if a, in particular, virtual, spacing of a position of unit 12 on future path of travel 40 of unit 12 and a future position of external object 22, 24, 26 ascertained as a function of an ascertained short-term movement parameter of an external object 22, 24, 26, falls below a predefined limiting value at at least one instant. In particular, emergency collision prevention algorithm 62 is executed at a higher priority than the control of unit 12/the device as a function of ascertained, possible future path of travel 40; for example, emergency control 66, in particular, emergency braking and/or an evasive movement, a movement originally planned, and/or a steering angle originally planned, being replaced and/or executed prior to this. Control and/or emergency control 66, in particular, emergency braking and/or an evasive movement, of unit 12 is preferably taken into account in further monitoring of surrounding area 28 and/or in a movement parameter of unit 12. In particular, surrounding area 28 and/or external objects 22, 24, 26 are monitored continuously by detection unit 14. Emergency collision prevention algorithm 62, in particular, emergency control 66, is intended for directly preventing collisions of the device/of unit 12 with external objects 22, 24, 26.

Figure 3:
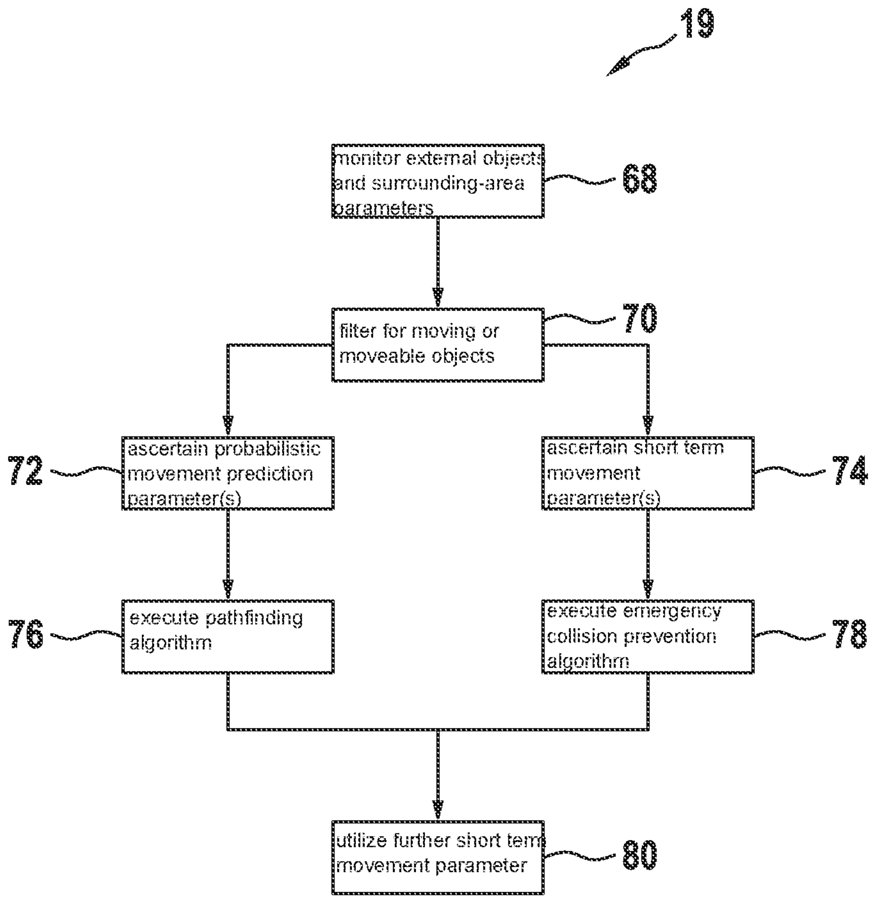
FIG. 3 shows a schematic representation of an example of the execution of the method according to the present invention.

An example of the execution of method 19 of ascertaining a direction of travel and/or a future path of travel of the unit 12 movable at least semiautonomously or autonomously in dynamically changeable surrounding area 28, is shown schematically in FIG. 3. In a method step 68 of method 19, external objects 22, 24, 28 and surrounding-area parameters of external objects 22, 24, 26 are monitored. In a method step of method 19, in particular, method step 68 or a further method step following it, as an alternative, or in addition, surrounding-area parameters of detected external objects 22, 24, 26 are ascertained partially or completely, with the aid of control and/or regulating unit 18, as a function of data about external objects 22, 24, 26 acquired by detection unit 14. In particular, the surrounding-area parameters may each be assigned to at least one external object 22, 24, 26, which moves relative to unit 12 and is in the area 28 surrounding unit 12. In a method step of method 19, in particular, method step 68, at least one movement parameter of unit 12, which describes, in particular, a current movement of unit 12 in surrounding area 28 and/or in space, is measured. It is possible for the movement parameter(s) of unit 12 to be measured, for example, via drive unit 16 of unit 12, with the aid of detection unit 14 and/or with the aid of control and/or regulating unit 18.

In a further method step 70 of method 19, all of the detected external objects 22, 24, 26 are filtered for moving or movable external objects 22, 24, 26; in particular, in the case of executing movement determination algorithm 38 later, in particular, only surrounding-area parameters associated with external objects 22, 24 moving and/or movable relative to surrounding area 28 being taken into consideration for ascertaining short-term movement parameters. As an alternative, it is possible for all detected, external objects 22, 24, 26 to be considered for movement determination algorithm 38.

In a further method step 72 of method 19, in particular, with the aid of processing unit 20, the movement prediction algorithm 36 for ascertaining, in each instance, at least one probabilistic movement prediction parameter for detected external objects 22, 24, 26, is executed as a function of measured surrounding-area parameters assigned to individual external objects 22, 24, 26. In a further method step 74 of method 19, in particular, with the aid of processing unit 20, the movement determination algorithm 38 for ascertaining, in each instance, at least one short-term movement parameter for detected external objects 22, 24, 26, is executed as a function of measured surrounding-area parameters assigned to individual external objects 22, 24, 26. In order to ascertain a future direction of travel and/or a future path of travel of unit 12, movement prediction algorithm 36 and movement determination algorithm 38 are executed at least substantially independently of each other. To ascertain the future path of travel and/or the future direction of travel of unit 12 as a function of detected external objects 22, 24, 26, movement determination algorithm 38 is considered at a higher priority than movement prediction algorithm 36. In a method step of method 19, in particular, method step 74, a number of short-term movement parameters or of values of a short-term movement parameter is ascertained, in particular, inversely proportionally, for respective external object 22, 24, 26 as a function of a number and/or type of different, measured surrounding-area parameters of individual external objects 22, 24, 26. In a method step of method 19, in particular, method step 74, at least one short-term movement parameter of one of detected external objects 22, 24, 26 is ascertained as a purely deterministic variable as a function of measured surrounding-area parameters of respective external object 22, 24, 26, in particular, exclusively with the aid of a stored physical computational model. Preferably, all of the short-term movement parameters ascertained by movement determination algorithm 38 are ascertained exclusively with the aid of the stored physical computational model, in the form of purely deterministic variables.

In a further method step 76 of method 19, pathfinding algorithm 64, in particular, a theta* pathfinding algorithm, is executed; with the aid of pathfinding algorithm 64, a, in particular, possible, future path of travel of unit 12 being determined dynamically as a function of the ascertained probabilistic movement prediction parameters of detected external objects 22, 24, 26.

In a further method step 78 of method 19, emergency collision prevention algorithm 62, which takes the form of, in particular, a part of model predictive control of unit 12, is executed, in particular, with the aid of control and/or regulating unit 18; emergency control, in particular, emergency braking and/or an evasive movement, of unit 12 being carried out with the aid of emergency collision prevention algorithm 62, if a, in particular, virtual, spacing of a position of unit 12 on the future path of travel of unit 12 and a future position of an external object 22, 24, 26 ascertained as a function of an ascertained short-term movement parameter, falls below a predefined limiting value at at least one instant. For example, an external object 22 (see FIG. 1) is ascertained, which would collide with, or has a high probability of colliding with, unit 12. Using emergency collision prevention algorithm 62, in particular, the above-mentioned emergency control 66 is preferably determined, by which unit 12 has, in particular, at least a certain probability of being able to prevent a collision with external object 22. For example, in this instance, emergency control 66 takes the form of the steering of unit 12 at a certain angle, as well as the simultaneous braking by a certain amount. In one method step of method 19, in particular, method step 78, a future path of travel of unit 12 is ascertained; in particular, in order to ascertain the future path of travel and/or direction of travel of unit 12 as a function of detected external objects 22, 24, 26, emergency control 66, which is carried out as a function of output signals of movement determination algorithm 38, being considered at a higher priority than the possible future path of travel of unit 12 ascertained by pathfinding algorithm 64 and/or as a function of output signals of movement prediction algorithm 36. In at least one method step of method 19, such as method step 80, it is possible for at least one short-term movement parameter of an external object 22, 24, 26 ascertained by movement determination algorithm 38, to be utilized, for example, to ascertain a surrounding-area parameter of respective external object 22, 24, 26, in particular, in a future iteration of method 19. Movement determination algorithm 38 and movement prediction algorithm 36 are executed in a periodically repeated manner; movement determination algorithm 38 being executed at a higher frequency than movement prediction algorithm 36. Pathfinding algorithm 64 and emergency collision prevention algorithm 62 are preferably executed in a periodically repeated manner; emergency collision prevention algorithm 62 preferably being executed at a higher frequency than pathfinding algorithm 64. If, for example, an external object 22 is ascertained, which would collide with unit 12, or has a high probability of colliding with it, in a directly subsequent short-term interval, then, in method step 78, emergency control 66 is first executed and/or initiated by control and/or regulating unit 18, instead of or before a movement of unit 12 along another future path of travel of unit 12 ascertained, in particular, using pathfinding algorithm 64, is executed and/or initiated by control and/or regulating unit 18.

In a further method step 80 of method 19, the future path of travel of unit 12 is determined by emergency control 66, in particular, emergency braking and/or an evasive movement, or by the future path of travel ascertained by pathfinding algorithm 64. The future, determined path of travel of unit 12 is preferably implemented by control and/or regulating unit 18; in particular, unit 12 being forced to move along the future path of travel determined. For example, drive unit 16 and/or at least a steering unit of unit 12/the device is controlled and/or regulated with the aid of control and/or regulating unit 18, using control signals.

A possible example of an embodiment of method 19 is described, in particular, in FIG. 3. Other refinements of method 19 are also possible, for example, having a different order of method steps 68, 70, 72, 74, 76, 78, 80 and/or a different number of method steps 68, 70, 72, 74, 76, 78, 80.

What is claimed is:

1. A method for ascertaining at least one of a direction of travel or a future path of travel of a unit movable at least semiautonomously or autonomously in a dynamically changeable surrounding area, the method comprising the following steps:

at least one of measuring or ascertaining a plurality of surrounding-area parameters, which may each be assigned to at least one moving, external object in an area surrounding the unit;

executing at least one movement prediction algorithm for ascertaining at least one probabilistic movement prediction parameter for each detected external object as a function of the surrounding-area parameters assigned to the detected external object, the probabilistic movement prediction parameter describing a behavior-based possible future path of travel of the external object;

executing at least one movement determination algorithm for ascertaining at least one deterministic short-term movement parameter for each detected external object as a function of the surrounding-area parameter assigned to the detected external object, wherein the deterministic short-term movement parameter describes a physically unavoidable path of travel of the external object and is ascertained exclusively based on kinematics via a physical computational model; and wherein the movement prediction algorithm and the movement determination algorithm are executed at least substantially independently of each other, to ascertain at least one of a future direction of travel or a future path of travel of the unit.

2. The method as recited in claim 1, wherein the unit is at least one of a robot or a vehicle.

3. The method as recited in claim 1, further comprising: subsequently to the executing of the movement determination algorithm, executing at least one emergency collision prevention algorithm is a part of a model predictive control of the unit, wherein emergency control including at least one of emergency braking, an evasive movement of the unit or of a future path of travel, is carried out using the emergency collision prevention algorithm, when a virtual spacing of a position of the unit on the future path of travel of the unit and a future position of a detected external object ascertained as a function of an ascertained short-term movement parameter of the at least one short-term movement parameter, falls below a predefined limiting value at at least one instant.

4. The method as recited in claim 1, further comprising: subsequently to the executing of the movement prediction algorithm, executing at least one pathfinding algorithm including a theta* pathfinding algorithm, wherein, using the pathfinding algorithm, a future path of travel of the unit is determined dynamically as a function of the ascertained probabilistic movement prediction parameters of the detected external object.

5. The method as recited in claim 1, wherein, to ascertain at least one of the future path of travel or direction of travel of the unit as a function of the detected external object, the movement determination algorithm is considered at a higher priority than the movement prediction algorithm.

6. The method as recited in claim 1, wherein, in the step of executing the movement determination algorithm, a number of short-term movement parameters or of values of a short-term movement parameter is ascertained, inversely proportionally, for each detected external object, as a function of at least one of a number or a type of different, measured surrounding-area parameters of the detected external object.

7. The method as recited in claim 1, wherein, in the step of executing the movement determination algorithm, at least one short-term movement parameter of each detected external object is ascertained as a deterministic variable as a function of measured surrounding-area parameters of the external object exclusively using a stored physical computational model.

8. The method as recited in claim 1, wherein all of detected external objects are filtered for moving or mobile external objects, wherein, in the executing of the movement determination algorithm, only surrounding-area parameters associated with moving or mobile external objects being taken into consideration for ascertaining the short-term movement parameters.

9. The method as recited in claim 1, wherein the movement determination algorithm is utilized to ascertain a surrounding-area parameter of the external object.

10. The method as recited in claim 1, wherein the movement determination algorithm and the movement prediction algorithm are executed in a periodically repeated manner, the movement determination algorithm being executed at a higher frequency than the movement prediction algorithm.

11. A system, comprising:

at least one processing unit, configured to ascertaining at least one of a direction of travel or a future path of travel of a unit movable at least semiautonomously or autonomously in a dynamically changeable surrounding area, wherein the processing unit is configured to:

at least one of measure or ascertain a plurality of surrounding-area parameters, which may each be assigned to at least one moving, external object in an area surrounding the unit;

execute at least one movement prediction algorithm for ascertaining at least one probabilistic movement prediction parameter for each detected external object as a function of the surrounding-area parameters assigned to the detected external object, the probabilistic movement prediction parameter describing a behavior-based possible future path of travel of the external object;

execute at least one movement determination algorithm for ascertaining at least one deterministic short-term movement parameter for each detected external object as a function of the surrounding-area parameter assigned to the detected external object, wherein the deterministic short-term movement parameter describes a physically unavoidable path of travel of the external object and is ascertained exclusively based on kinematics via a physical computational model; and wherein the movement prediction algorithm and the movement determination algorithm are executed at least substantially independently of each other, to ascertain at least one of a future direction of travel or a future path of travel of the unit.

12. The system as recited in claim 11, wherein unit is a robot movable semiautonomously or autonomously.

13. The method as recited in claim 1, wherein input parameters and output parameters of the movement prediction algorithm and the movement determination algorithm are independent from each other, and wherein the movement prediction algorithm and the movement determination algorithm are executed temporally independently.

14. The method as recited in claim 1, wherein the behavior-based possible future path of travel is described for a time frame of more than ten seconds, and wherein the physically unavoidable path of travel is described for a short-term interval of not more than five seconds.

15. The system as recited in claim 11, wherein the behavior-based possible future path of travel is described for a time frame of more than ten seconds, and wherein the physically unavoidable path of travel is described for a short-term interval of not more than five seconds.

* * * * *